United States Patent
Umeyama et al.

(10) Patent No.: US 9,692,048 B2
(45) Date of Patent: Jun. 27, 2017

(54) NONAQUEOUS ELECTROLYTE RECHARGEABLE BATTERY

(71) Applicant: TOYOTA JIDOSHA KABUSHIKI KAISHA, Toyota-shi, Aichi-ken (JP)

(72) Inventors: Hiroya Umeyama, Okazaki (JP); Yusuke Fukumoto, Toyonaka (JP); Hideki Sano, Ikeda (JP); Yuji Yokoyama, Moriguchi (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 151 days.

(21) Appl. No.: 14/837,214

(22) Filed: Aug. 27, 2015

(65) Prior Publication Data
US 2016/0093877 A1 Mar. 31, 2016

(30) Foreign Application Priority Data
Sep. 25, 2014 (JP) .................................. 2014-194993

(51) Int. Cl.
| | | |
|---|---|---|
| H01M 4/36 | (2006.01) |
| H01M 4/62 | (2006.01) |
| H01M 4/131 | (2010.01) |
| H01M 4/505 | (2010.01) |
| H01M 4/587 | (2010.01) |
| H01M 4/525 | (2010.01) |
| H01M 4/58 | (2010.01) |

(Continued)

(52) U.S. Cl.
CPC ........... *H01M 4/364* (2013.01); *H01M 4/131* (2013.01); *H01M 4/366* (2013.01); *H01M 4/624* (2013.01); *H01M 4/663* (2013.01); *H01M 4/667* (2013.01); *H01M 4/136* (2013.01); *H01M 4/505* (2013.01); *H01M 4/525* (2013.01); *H01M 4/587* (2013.01); *H01M 4/5825* (2013.01); *H01M 4/625* (2013.01); *H01M 4/661* (2013.01); *H01M 2004/021* (2013.01)

(58) Field of Classification Search
None
See application file for complete search history.

(56) References Cited

U.S. PATENT DOCUMENTS

2012/0231341 A1   9/2012  Kim et al.
2012/0315530 A1  12/2012  Kageura

FOREIGN PATENT DOCUMENTS

| JP | 10-92415 A | 4/1998 |
| JP | 2001-015114 A | 1/2001 |

(Continued)

*Primary Examiner* — Patrick Ryan
*Assistant Examiner* — Wyatt McConnell
(74) *Attorney, Agent, or Firm* — Sughrue Mion, PLLC

(57) ABSTRACT

A positive electrode collector includes a main body layer and a surface layer. The surface layer is provided at least at a portion of a surface of the main body layer where the positive electrode mixture layer is provided, and is made of a carbon material. A first positive electrode active material is made of first lithium complex oxide having a layered crystal structure. A second positive electrode active material includes a particle made of second lithium complex oxide having an olivine crystal structure, a carbon film provided at least at a part of a surface of the particle, and alginic acid salt provided at least at a part of a surface of the carbon film. A conducting agent in the positive electrode mixture layer includes a carbon particle and alginic acid salt provided at least at a part of a surface of the carbon particle.

4 Claims, 6 Drawing Sheets

(51) Int. Cl.
*H01M 4/02* (2006.01)
*H01M 4/136* (2010.01)
*H01M 4/66* (2006.01)

(56) References Cited

FOREIGN PATENT DOCUMENTS

| | | |
|---|---|---|
| JP | 2012-190786 A | 10/2012 |
| JP | 2013-161832 A | 8/2013 |
| JP | 2014-026777 A | 2/2014 |
| JP | 2014-096238 A | 5/2014 |
| KR | 10-2012-0040223 A | 4/2012 |
| WO | 2011/013756 A1 | 2/2011 |
| WO | 2011/102497 A1 | 8/2011 |

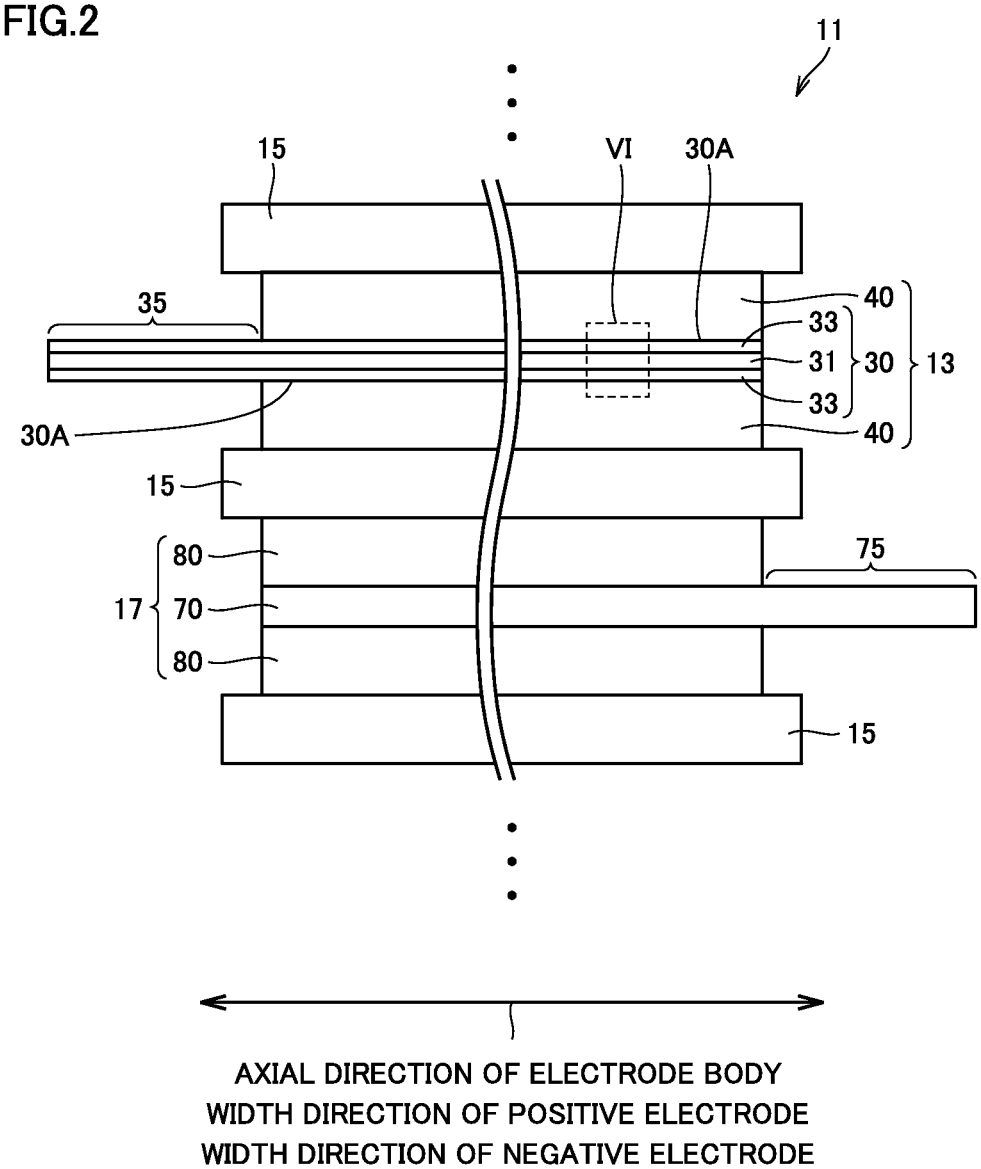

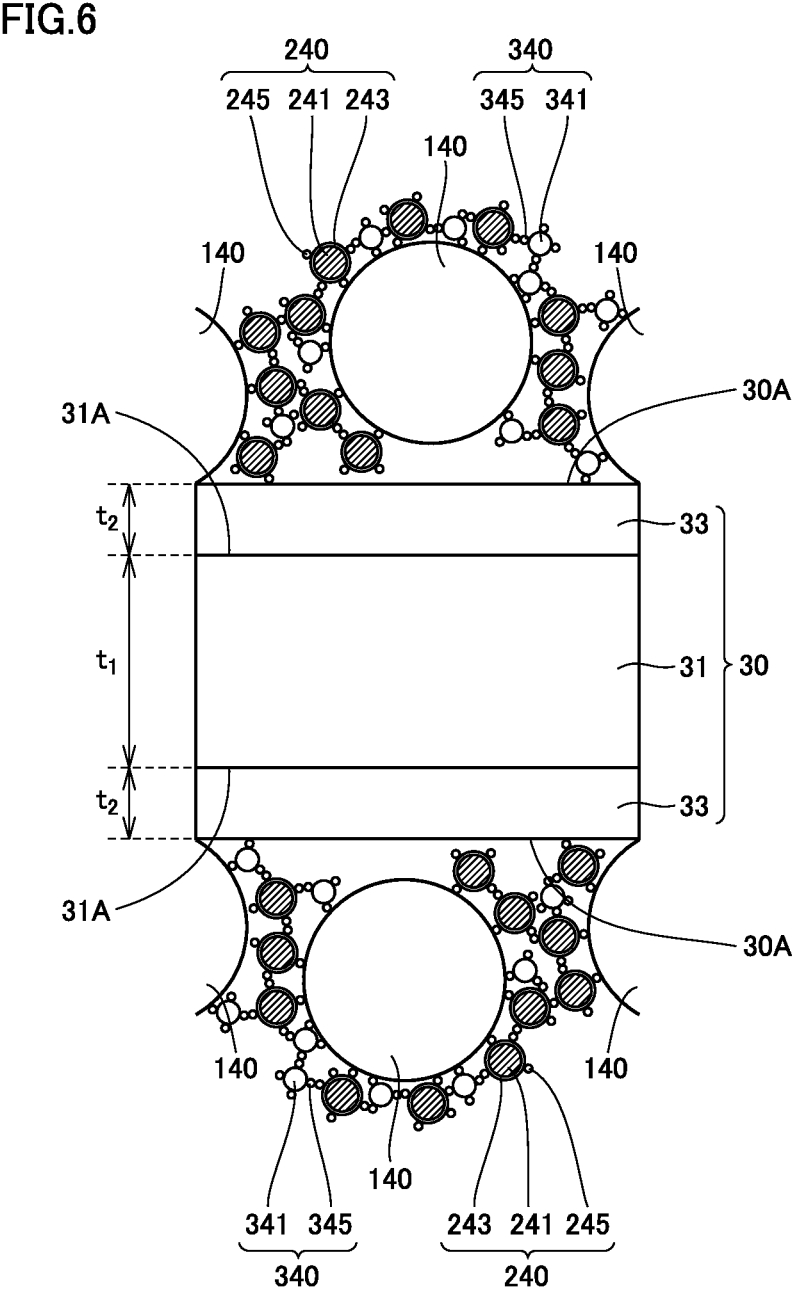

NONAQUEOUS ELECTROLYTE RECHARGEABLE BATTERY

This nonprovisional application is based on Japanese Patent Application No. 2014-194993 filed on Sep. 25, 2014 with the Japan Patent Office, the entire contents of which are hereby incorporated by reference.

BACKGROUND OF THE INVENTION

Field of the Invention

The present invention relates to a nonaqueous electrolyte rechargeable battery.

Description of the Background Art

Japanese Patent Laying-Open No. 2012-190786 discloses that a positive electrode active material contains lithium nickel complex oxide and a phosphate compound having an olivine structure. This document discloses that using the positive electrode active material can enhance a conductivity of the positive electrode active material and its electrode density, so that a capacity of a lithium-ion rechargeable battery and its high rate characteristic can be enhanced.

SUMMARY OF THE INVENTION

The present inventors have confirmed that using lithium complex oxide having a layered crystal structure and lithium complex oxide having an olivine crystal structure as positive electrode active materials enhances an output of a nonaqueous electrolyte rechargeable battery in a low SOC (State Of Charge). However, it has been found recently that a performance of a nonaqueous electrolyte rechargeable battery is lowered when charging and discharging are performed repeatedly at a high rate with respect to the nonaqueous electrolyte rechargeable battery. An object of the present invention is to provide a nonaqueous electrolyte rechargeable battery which exhibits a superior output in a low SOC and is capable of maintaining a high performance even when charging and discharging are performed at a high rate.

A nonaqueous electrolyte rechargeable battery of the present invention comprises a positive electrode including a positive electrode collector and a positive electrode mixture layer provided on a surface of the positive electrode collector. The positive electrode collector has a main body layer and a surface layer. The surface layer is provided at least at a portion of a surface of the main body layer where the positive electrode mixture layer is provided, and is made of carbon material. The positive electrode mixture layer has a first positive electrode active material, a second positive electrode active material, and a conducting agent. The first positive electrode active material is made of first lithium complex oxide having a layered crystal structure. The second positive electrode active material includes a particle made of second lithium complex oxide having an olivine crystal structure, a carbon film provided at least at a part of a surface of the particle made of second lithium complex oxide, and alginic acid salt provided at least at a part of a surface of the carbon film. The conducting agent includes a carbon particle and alginic acid salt provided at least at a part of a surface of the carbon particle.

In the nonaqueous electrolyte rechargeable battery having the configuration described above, since lithium complex oxide having an olivine crystal structure is used as a positive electrode active material, an output of the nonaqueous electrolyte rechargeable battery in a low SOC can be enhanced.

Moreover, the alginic acid salt can enhance an adhesion between second positive electrode active materials, an adhesion between the second positive electrode active material and the conducting agent, and an adhesion between the second positive electrode active material and the positive electrode collector. Accordingly, even when charging and discharging are performed repeatedly at a high rate with respect to the nonaqueous electrolyte rechargeable battery of the present invention, a local increase in an expansion amount and a contraction amount of the positive electrode active material in the positive electrode mixture layer can be prevented, so that a local increase in an ejected amount of nonaqueous electrolyte from the positive electrode mixture layer can be prevented. Therefore, a performance of the nonaqueous electrolyte rechargeable battery can be maintained high.

The "first lithium complex oxide having a layered crystal structure" means a compound expressed by a general expression of $LiNi_aCo_bMn_cO_2$ ($0<a<1$, $0<b<1$, $0<c<1$, $a+b+c=1$), and it will be referred to as "NCM" in the following paragraphs. The "second lithium complex oxide having an olivine crystal structure" means a compound expressed by a general expression of $Li_xFePO_4$ ($0 \le x < 1$), and it will be referred to as "LiFePO$_4$" in the following paragraphs. The "lithium complex oxide" means oxide containing a lithium element and one or more kind of a transition metal element.

In the positive electrode mixture layer, a sum total of a mass of the alginic acid salt included in the second positive electrode active material and a mass of the alginic acid salt included in the conducting agent is preferably greater than or equal to 0.6 mass % and less than or equal to 1.2 mass % with respect to a sum total of a mass of the first lithium complex oxide and a mass of the second lithium complex oxide. Accordingly, an adhesion between the second positive electrode active materials, an adhesion between the second positive electrode active material and the conducting agent, and an adhesion between the second positive electrode active material and the positive electrode collector can be further enhanced.

A thickness of the surface layer is preferably greater than or equal to 0.06 times and less than or equal to 0.2 times with respect to a thickness of the main body layer. Accordingly, an adhesion between the second positive electrode active material and the positive electrode collector can be further enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a cross sectional view representing a part of an electrode body in accordance with one embodiment of the present invention.

FIG. 6 is an enlarged view representing a region VI shown in FIG. 2.

DESCRIPTION OF THE PREFERRED EMBODIMENTS

Figure 1:
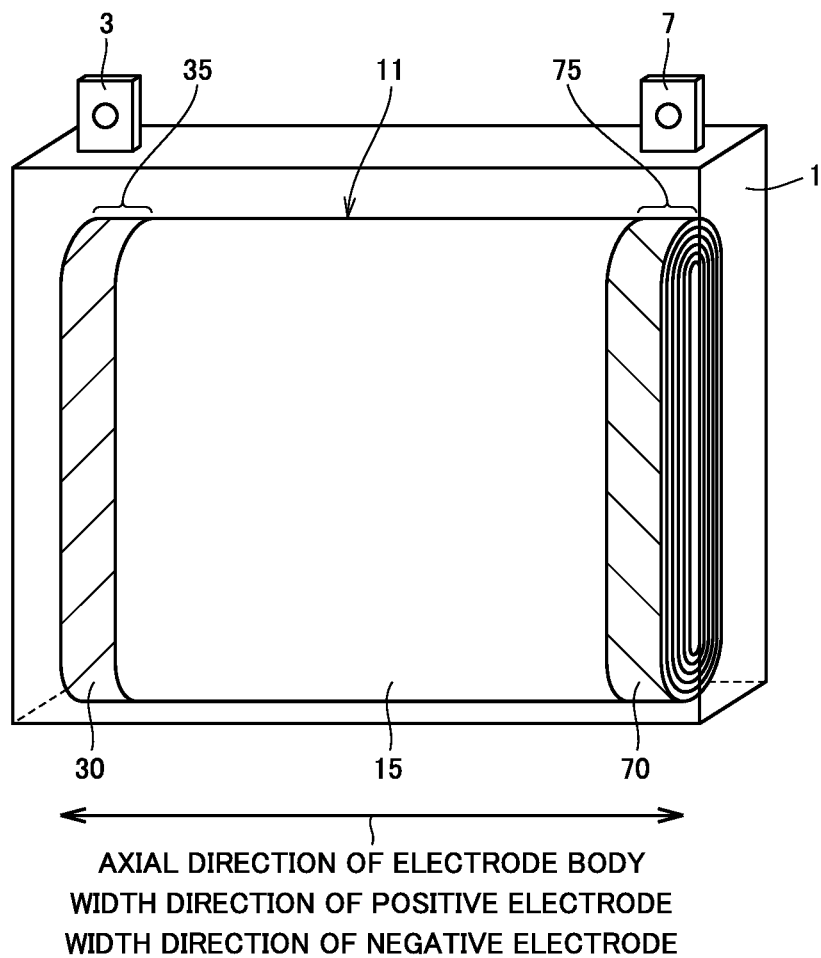
FIG. 1 is a perspective view representing a relevant part of a nonaqueous electrolyte rechargeable battery in accordance with one embodiment of the present invention.

Hereinafter, the present invention will be described with reference to the drawings. It should be noted that, in the drawings of the present invention, the same reference numerals indicate the same parts or corresponding parts. Moreover, dimensions such as a length, a width, a thickness, a depth, and the like are suitably changed to clarify and simplify the drawings, and do not represent actual dimensions.

In the following paragraphs, in the case where a performance of a nonaqueous electrolyte rechargeable battery is lowered when charging and discharging are performed repeatedly at a high rate with respect to the nonaqueous electrolyte rechargeable battery, it is sometimes described as "a high-rate characteristic is deteriorated" or "deterioration in a high-rate characteristic." Moreover, in the case where a performance of the nonaqueous electrolyte rechargeable battery can be maintained high even when charging and discharging are performed repeatedly at a high rate with respect to the nonaqueous electrolyte rechargeable battery, it is sometimes described as "deterioration in a high-rate characteristic is prevented."

[Configuration of Nonaqueous Electrolyte Rechargeable Battery]

FIG. 1 is a perspective view representing a relevant part of a nonaqueous electrolyte rechargeable battery in accordance with one embodiment of the present invention. FIG. 2 is a cross sectional view representing a part of an electrode body in accordance with the present embodiment.

In the nonaqueous electrolyte rechargeable battery in accordance with the present embodiment, an electrode body 11 and nonaqueous electrolyte (not shown) are provided in a battery case 1. In electrode body 11, a positive electrode 13 and a negative electrode 17 are wound with separators 15 sandwiched therebetween. Positive electrode 13 has a positive electrode collector 30 and positive electrode mixture layers 40 provided on surfaces 30A of positive electrode collector 30. Negative electrode 17 has a negative electrode collector 70 and negative electrode mixture layers 80 provided on surfaces of negative electrode collector 70. Separator 15 is provided between positive electrode mixture layer 40 and negative electrode mixture layer 80. The nonaqueous electrolyte is retained by positive electrode mixture layer 40, separator 15, and negative electrode mixture layer 80.

At one end of positive electrode 13 in a width direction, positive electrode collector 30 is exposed (positive electrode exposed portion 35) without providing positive electrode mixture layer 40. At one end of negative electrode 17 in a width direction, negative electrode collector 70 is exposed (negative electrode exposed portion 75) without providing negative electrode mixture layer 80. In electrode body 11, positive electrode exposed portion 35 and negative electrode exposed portion 75 protrude in directions opposite to each other toward an outer side in a width direction of positive electrode 13 (or an outer side in a width direction of negative electrode 17) than separator 15. A positive electrode terminal 3 provided on battery case 1 is connected to positive electrode exposed portion 35, and a negative electrode terminal 7 provided on battery case 1 is connected to negative electrode exposed portion 75.

[Positive Electrode]

The present inventors have diligently studied the reason why a high-rate characteristic was deteriorated in the nonaqueous electrolyte rechargeable battery containing NCM and $LiFePO_4$ as positive electrode active materials, and obtained the following knowledge. In the following paragraphs, the knowledge obtained by the present inventors is shown, and thereafter positive electrode 13 will be shown.

Figure 3A:
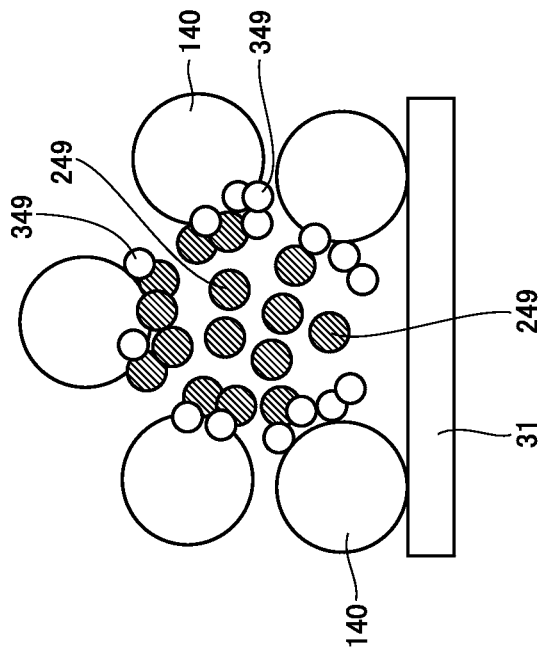
FIG. 3A is a cross sectional view schematically representing a relevant part of a conventional positive electrode in an initial stage of charging and discharging at a high rate.
Figure 3B:
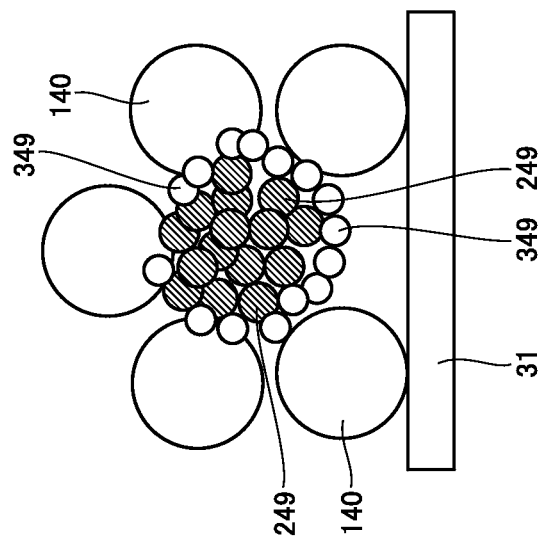
FIG. 3B is a cross sectional view schematically representing a relevant part of a conventional positive electrode in a last stage of charging and discharging at a high rate.

FIG. 3A is a cross sectional view schematically representing a relevant part of a conventional positive electrode in an initial stage of charging and discharging at a high rate. FIG. 3B is a cross sectional view schematically representing a relevant part of a conventional positive electrode in a last stage of charging and discharging at a high rate.

When a positive electrode mixture layer containing NCM and $LiFePO_4$ is formed, particles 140 made of NCM (hereinafter, referred to as "NCM particles"), particles 249 each configured by covering at least a part of a surface of a particle made of $LiFePO_4$ with a carbon material (hereinafter, referred to as "$LiFePO_4$/C particles"), and particles 349 made of acetylene black (hereinafter, referred to as "acetylene black particles") are mixed. Herein, in order to secure an output characteristic of the nonaqueous electrolyte rechargeable battery, a particle diameter of $LiFePO_4$/C particle 249 is set to be smaller than a particle diameter of NCM particle 140. Moreover, a specific gravity of acetylene black particle 349 is smaller than a specific gravity of NCM particle 140 and a specific gravity of $LiFePO_4$/C particle 249. From this, even when NCM particles 140, $LiFePO_4$/C particles 249, and acetylene black particles 349 are mixed, it would be difficult to evenly disperse those particles, and an aggregate of $LiFePO_4$/C particles 249 (a matter constituted of two or more aggregated $LiFePO_4$/C particles 249) is formed. Acetylene black particles 349 are present so as to surround the aggregate of $LiFePO_4$/C particles 249 (FIG. 3A).

The aggregate of $LiFePO_4$/C particles 249 is formed when NCM particles 140, $LiFePO_4$/C particles 249, and acetylene black particles 349 are mixed, and hardly any binding agent is present in the aggregate. Therefore, $LiFePO_4$/C particles 249 constituting the aggregate described above are not adhered to each other, thus a mechanical strength of the aggregate described above is low.

When the mechanical strength of the aggregate of $LiFePO_4$/C particles 249 is low, and $LiFePO_4$/C particles 249 constituting this aggregate is expanded or contracted by charging and discharging at a high rate, the aggregate described above is expanded or contracted by following the expansion and contraction of the particles. Therefore, when charging and discharging are performed repeatedly at a high rate, the aggregate described above repeats expansion and contraction, and consequently the size of the aggregate described above becomes less likely to restore the size before expansion. In other words, an occupied volume of the aggregate described above in the positive electrode mixture layer becomes large (FIG. 3B). Therefore, at a part of the positive electrode mixture layer where the aggregate described above is formed, the nonaqueous electrolyte is readily ejected to outside of the positive electrode mixture layer.

Herein, the expansion amount or contraction amount of LiFePO$_4$/C particles 249 due to charging and discharging is greater than the expansion amount or contraction amount of NCM particles 140 due to charging and discharging. Therefore, the ejection of the nonaqueous electrolyte from the positive electrode mixture layer becomes remarkable. From the above, when charging and discharging are performed repeatedly at a high rate with respect to the nonaqueous electrolyte rechargeable battery containing NCM and LiFePO$_4$/C as positive electrode active materials, a liquid shortage readily occurs at a portion of the positive electrode mixture layer where the aggregate described above is formed, so that the concentration unevenness of lithium ion readily occurs. Consequently, since the resistance unevenness of the electrode body readily occurs, lowering in a performance of the nonaqueous electrolyte rechargeable battery is induced (deterioration in the high-rate characteristic).

Not only that, when the mechanical strength of the aggregate of LiFePO$_4$/C particles 249 is low, expansion or contraction of NCM particles 140 or LiFePO$_4$/C particles 249 located around this aggregate may break the aggregate. When the aggregate described above is broken, at least a part of LiFePO$_4$/C particles 249 having been constituted the aggregate described above or at least a part of acetylene black particles 349 having been present around the aggregate may be inserted into fine pores of the positive electrode mixture layer. Consequently, at a portion of the positive electrode mixture layer where the aggregate is broken, the nonaqueous electrolyte is readily ejected to outside of the positive electrode mixture layer. This may also induce a deterioration in the high-rate characteristic.

Moreover, the aggregate of LiFePO$_4$/C particles 249 has a space therein. Therefore, a space for expansion is secured for LiFePO$_4$/C particles 249 constituting the aggregate described above. Therefore, LiFePO$_4$/C particles 249 constituting the aggregate described above more readily expands or contracts than LiFePO$_4$/C particles 249 not constituting the aggregate described above. This also causes the nonaqueous electrolyte to be readily ejected to outside of the positive electrode mixture layer at a portion of the positive electrode mixture layer where the aggregate described above is formed, so that a deterioration in the high-rate characteristic is induced.

From the consideration described above, the present inventors thought that the deterioration in the high-rate characteristic can be prevented by avoiding formation of the aggregate of LiFePO$_4$/C particles 249. Herein, the present inventors uniquely obtained the knowledge that the alginic acid salt selectively adheres to a surface of a carbon material. The present inventors conducted further consideration based on this knowledge and arrived at positive electrode 13. In the following paragraphs, positive electrode 13 will be shown.

Figure 4:
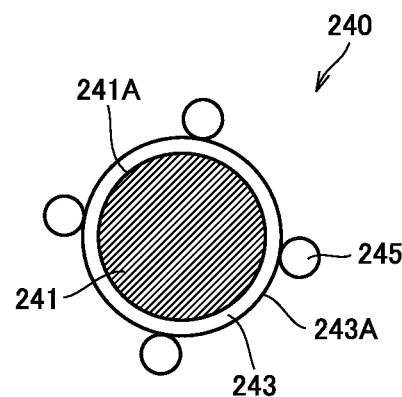
FIG. 4 is a schematic cross sectional view representing a second positive electrode active material in accordance with one embodiment of the present invention.
Figure 5:
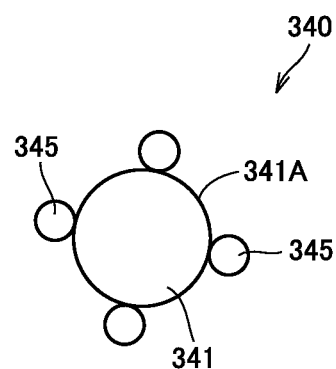
FIG. 5 is a schematic cross sectional view representing a conducting agent in accordance with one embodiment of the present invention.
Figure 7A:
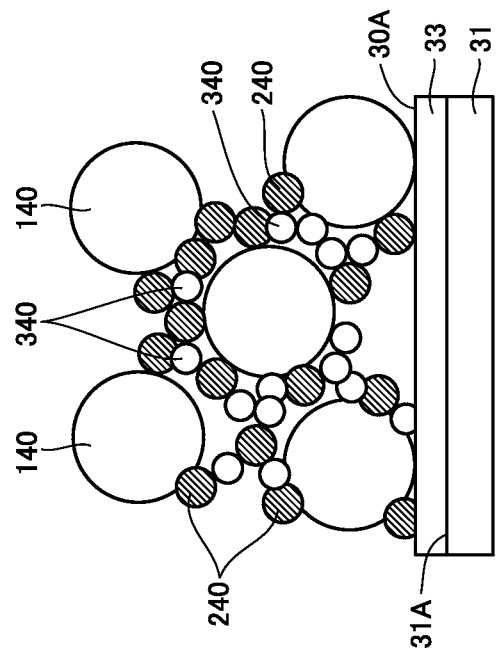
FIG. 7A is a cross sectional view schematically representing a relevant part of a positive electrode in accordance with one embodiment of the present invention in an initial stage of charging and discharging at a high rate.
Figure 7B:
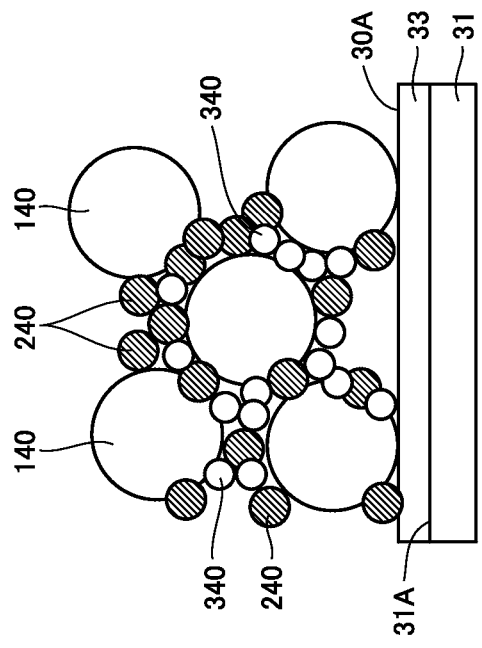
FIG. 7B is a cross sectional view schematically representing a relevant part of a positive electrode in accordance with one embodiment of the present invention in a last stage of charging and discharging at a high rate.

FIG. 4 is a schematic cross sectional view representing a second positive electrode active material 240 included in positive electrode mixture layer 40. FIG. 5 is a schematic cross sectional view representing a conducting agent 340 included in positive electrode mixture layer 40. FIG. 6 is an enlarged view representing a region VI shown in FIG. 2. FIG. 7A is a cross sectional view schematically representing a relevant part of positive electrode 13 in an initial stage of charging and discharging at a high rate. FIG. 7B is a cross sectional view schematically representing a relevant part of positive electrode 13 in a last stage of charging and discharging at a high rate.

As described above, positive electrode 13 has positive electrode collector 30 and positive electrode mixture layer 40. Positive electrode collector 30 has a main body layer 31 and surface layers 33. Surface layer 33 is provided at least at a portion of a surface 31A of main body layer 31 where positive electrode mixture layer 40 is provided, and it is made of a carbon material.

Positive electrode mixture layer 40 includes a first positive electrode active material 140, a second positive electrode active material 240, and a conducting agent 340. First positive electrode active material 140 is an NCM particle. Second positive electrode active material 240 includes an LiFePO$_4$ particle 241, a carbon film 243 provided at least at a part of a surface 241A of LiFePO$_4$ particle 241, and alginic acid salt 245 provided at least at a part of a surface 243A of carbon film 243. Conducting agent 340 includes a carbon particle 341 and alginic acid salt 345 provided at least at a part of a surface 341A of carbon particle 341.

As described above, since positive electrode 13 contains LiFePO$_4$ as a positive electrode active material, an output of the nonaqueous electrolyte rechargeable battery in a low SOC can be enhanced. Accordingly, the nonaqueous electrolyte rechargeable battery in accordance with the present embodiment is suitable for an application in which an output in a low SOC is required (for example, an application as a power supply for a vehicle).

Moreover, surface layer 33 of positive electrode collector 30 is made of a carbon material, and alginic acid salt 245 adheres to at least a part of surface 243A of carbon film 243 in second positive electrode active material 240, and alginic acid salt 345 adheres to at least a part of surface 341A of carbon particle 341 in conducting agent 340. Accordingly, second positive electrode active material 240 adheres to surface layer 33, other second positive electrode active material 240, or conducting agent 340 by means of alginic acid salt 245 (FIGS. 6 and 7A).

Since second positive electrode active material 240 adheres to surface layer 33 by means of alginic acid salt 245, an adhered state between second positive electrode active material 240 and surface layer 33 can be prevented from being locally released even when charging and discharging are performed repeatedly at a high rate with respect to the nonaqueous electrolyte rechargeable battery in accordance with the present embodiment (FIG. 7B). Accordingly, in positive electrode mixture layer 40, a local increase in the expansion amount and contraction amount of LiFePO$_4$ particle 241 can be prevented.

Since second positive electrode active material 240 adheres to other second positive electrode active material 240 or conducting agent 340 by means of alginic acid salt 245, formation of an aggregate of LiFePO$_4$/C particles 249 can be prevented. In other words, even when charging and discharging are performed repeatedly at a high rate with respect to the nonaqueous electrolyte rechargeable battery in accordance with the present embodiment, an adhered state of second positive electrode active materials 240 can be prevented from being locally released, and an adhered state between second positive electrode active material 240 and conducting agent 340 can be prevented from being locally released (FIG. 7B). Also from those, a local increase in the expansion amount and contraction amount of LiFePO$_4$ particle 241 in positive electrode mixture layer 40 can be prevented.

As described above, even when charging and discharging are performed repeatedly at a high rate with respect to the nonaqueous electrolyte rechargeable battery in accordance with the present embodiment, a local increase in the expansion amount and contraction amount of LiFePO$_4$ particle 241 in positive electrode mixture layer 40 can be prevented. Accordingly, since a local increase in the ejected amount of the nonaqueous electrolyte from positive electrode mixture layer 40 can be prevented, occurrence of the lithium ion concentration unevenness in positive electrode mixture layer 40 can be prevented. Therefore, occurrence of the resistance unevenness in electrode body 11 can be prevented. Thus, even when charging and discharging are performed repeatedly at a high rate with respect to the nonaqueous electrolyte rechargeable battery in accordance with the present embodiment, its performance can be maintained high (a deterioration in the high-rate characteristic can be prevented).

Moreover, second positive electrode active material 240 adheres to surface layer 33 by means of alginic acid salt 245, and conducting agent 340 adheres to surface layer 33 by means of alginic acid salt 345. Accordingly, second positive electrode active material 240 and conducting agent 340 can be prevented from being dropped out from positive electrode collector 30 during production and use. Therefore, lowering in a performance of the nonaqueous electrolyte rechargeable battery (for example, lowering in the battery capacity) during production and use can be prevented. Not only that, even when the nonaqueous electrolyte rechargeable battery in accordance with the present embodiment is overdischarged, its performance can be maintained high. Each configuration of positive electrode 13 will be further shown.

<<Positive Electrode Collector>>

By observing a cross sectional SEM (Scanning Electron Microscope) image of positive electrode mixture layer 40, a configuration of positive electrode collector 30 (for example, whether or not surface layer 33 is provided on surface 31A of main body layer 31) can be confirmed. Moreover, compositions of main body layer 31 and surface layer 33 can be found by means of an energy disperse X-ray spectroscopy (EDX).

(Main Body Layer)

Main body layer 31 preferably has a conductivity, and is preferably made of metal or alloy. Main body layer 31 may be a plate-like member, may be a foil-like member, or may be configured to have two or more through holes formed in a plate-like member or a foil-like member. Main body layer 31 more preferably has a conventional configuration as a positive electrode collector of a nonaqueous electrolyte rechargeable battery, and for example is an aluminum foil having a thickness of greater than or equal to 5 μm and less than or equal to 50 μm.

(Surface Layer)

When surface layer 33 is provided at a portion of surface 31A of main body layer 31 where positive electrode mixture layer 40 is provided, second positive electrode active material 240 and conducting agent 340 can be adhered to surface layer 33. However, surface layer 33 may be provided entirely on surface 31A of main body layer 31. Accordingly, as compared to the case where surface layer 33 is provided only at a portion of surface 31A of main body layer 31 where positive electrode mixture layer 40 is provided, surface layer 33 can be readily formed on surface 31A of main body layer 31.

Herein, the case where "surface layer 33 is provided at a portion of surface 31A of main body layer 31 where positive electrode mixture layer 40 is provided" includes not only the case where surface layer 33 is provided entirely at a portion of surface 31A of main body layer 31 where positive electrode mixture layer 40 is provided, but also the case where a covering ratio of surface layer 33 at a portion of surface 31A of main body layer 31 where positive electrode mixture layer 40 is provided is greater than or equal to 50%. When the covering ratio of surface layer 33 at a portion of surface 31A of main body layer 31 where positive electrode mixture layer 40 is provided is greater than or equal to 50%, an adhesion of second positive electrode active material 240 and conducting agent 340 with respect to surface layer 33 can be secured.

The "surface layer 33 made of a carbon material" includes not only the case where surface layer 33 is made only of a carbon material, but also the case where an adhesive agent (for example, PVdF (PolyVinylidene DiFluoride)) for adhering a carbon material to surface 31A of main body layer 31 is included in surface layer 33. The carbon material included in surface layer 33 is preferably a carbon material which has been conventionally known as a conducting agent of positive electrode mixture layer 40, and is at least one of, for example, acetylene black, Ketchen Black (registered trademark), flaky graphite, massive graphite, earthy graphite, and vapor-grown carbon fiber.

A thickness $t_2$ of surface layer 33 is preferably greater than or equal to 0.06 times and less than or equal to 0.2 times with respect to a thickness $t_1$ of main body layer 31. When thickness $t_2$ of surface layer 33 is greater than or equal to 0.06 times with respect to thickness $t_1$ of main body layer 31, an adhesion of second positive electrode active material 240 and conducting agent 340 with respect to surface layer 33 can be further enhanced. Therefore, a deterioration in the high-rate characteristic can be further prevented. Moreover, lowering in a performance of the nonaqueous electrolyte rechargeable battery during production or use can be further prevented. Further, even when the nonaqueous electrolyte rechargeable battery in accordance with the present embodiment is overdischarged, its performance can be further maintained high.

When thickness $t_2$ of surface layer 33 is less than or equal to 0.2 times with respect to thickness $t_1$ of main body layer 31, the thickness of positive electrode collector 30 can be prevented from being too large, so that the content of the positive electrode active material can be secured, and a battery capacity of the nonaqueous electrolyte rechargeable battery can be maintained high. Thickness $t_2$ of surface layer 33 is more preferably greater than or equal to 0.1 times and less than or equal to 0.2 times with respect to thickness $t_1$ of main body layer 31, and is for example greater than or equal to 0.9 μm and less than or equal to 3 μm.

Herein, "thickness $t_1$ of main body layer 31" means a size of main body layer 31 in a vertical direction with respect to a face of main body layer 31 in contact with surface layer 33 (in other words, surface 31A of main body layer 31), and it can be found by using a cross sectional SEM image of positive electrode collector 30. This similarly applies to "thickness $t_2$ of surface layer 33."

<<Positive Electrode Mixture Layer>>

<Positive Electrode Active Material>

Positive electrode mixture layer 40 includes first positive electrode active material 140 and second positive electrode active material 240 as positive electrode active materials. The content of the positive electrode active materials in positive electrode mixture layer 40 is preferably the content which has been conventionally known as the content of a positive electrode active material in a positive electrode mixture layer of a nonaqueous electrolyte rechargeable battery. For example, positive electrode mixture layer 40 contains positive electrode active materials of preferably greater than or equal to 80 mass % and less than or equal to 95 mass %, more preferably greater than or equal to 80 mass % and less than or equal to 90 mass %, yet more preferably greater than or equal to 85 mass % and less than or equal to 90 mass %.

It should be noted that, as long as the effect described in the present embodiment can be achieved, positive electrode mixture layer 40 may further include lithium complex oxide which is different from first positive electrode active material 140 and second positive electrode active material 240.

<First Positive Electrode Active Material>

The positive electrode active material includes NCM particles (first positive electrode active material 140) of preferably greater than or equal to 80 mass % and less than or equal to 90 mass %, more preferably greater than or equal to 85 mass % and less than or equal to 90 mass %. A composition of first positive electrode active material 140 can be found by means of EDX. Moreover, a mass of first positive electrode active material 140 included in positive electrode mixture layer 40 can be found by means of SEM and EDX.

In the general expression $LiNi_aCo_bMn_cO_2$ of NCM, the items a, b, and c preferably satisfy $0.2<a<0.4$, $0.2<b<0.4$, $0.2<c<0.4$, more preferably $0.3<a<0.35$, $0.3<b<0.35$, $0.3<c<0.35$. The NCM may be doped with a foreign element such as magnesium (Mg), silicon (Si), calcium (Ca), titanium (Ti), vanadium (V), chromium (Cr), zinc (Zn), gallium (Ga), zirconium (Zr), niobium (Nb), molybdenum (Mo), tin (Sn), hafnium (Hf), or tungsten (W).

The form of first positive electrode active material 140 is not limited to the form shown in FIG. 6. For example, the case where "first positive electrode active material 140 is an NCM particle" includes not only the case where first positive electrode active material 140 is a sphere but also the case where first positive electrode active material 140 has a distorted spherical shape. A median diameter (d50) of first positive electrode active material 140 (for example, a median diameter (d50) of a secondary particle of NCM) is preferably greater than or equal to 1 µm and less than or equal to 20 µm, more preferably greater than or equal to 3 µm and less than or equal to 15 µm, yet more preferably greater than or equal to 5 µm and less than or equal to 10 µm. The median diameter (d50) of first positive electrode active material 140 can be measured by a laser diffraction scattering method.

The "secondary particle" means an aggregate of a plurality of primary particles. The "primary particle" is an aggregate of a plurality of single crystals or an aggregate of a plurality of crystallites which are close to single crystals, and is considered as an ultimate particle as determined from a geometric form of appearance.

<Second Positive Electrode Active Material>

By observing a cross sectional SEM image of positive electrode mixture layer 40, a configuration of second positive electrode active material 240 (for example, whether or not carbon film 243 is provided at least at a part of surface 241A of LiFePO$_4$ particle 241, or whether or not alginic acid salt 245 is provided at least at a part of surface 243A of carbon film 243) can be confirmed. Compositions of LiFePO$_4$ particle 241, carbon film 243, and alginic acid salt 245 can be found by means of the EDX. The median diameter (d50) of LiFePO$_4$ particle 241 can be measured by means of a laser diffraction scattering method.

(LiFePO$_4$ Particle)

The positive electrode active material includes LiFePO$_4$ particle 241 of preferably greater than or equal to 10 mass % and less than or equal to 20 mass %, more preferably greater than or equal to 10 mass % and less than or equal to 15 mass %.

In LiFePO$_4$, some iron (Fe) may be replaced with an element other than iron (for example, cobalt (Co), manganese (Mn), or nickel (Ni)). LiFePO$_4$ may be doped with a foreign element such as magnesium (Mg), silicon (Si), calcium (Ca), titanium (Ti), vanadium (V), chromium (Cr), zinc (Zn), gallium (Ga), zirconium (Zr), niobium (Nb), molybdenum (Mo), tin (Sn), hafnium (Hf), or tungsten (W).

The form of LiFePO$_4$ particle 241 is not limited to the form shown in FIG. 4. For example, "LiFePO$_4$ particle 241" includes not only the case where LiFePO$_4$ particle 241 is a sphere but also the case where LiFePO$_4$ particle 241 has a distorted spherical shape. The median diameter (d50) of LiFePO$_4$ particle 241 (for example, the median diameter (d50) of a secondary particle of LiFePO$_4$) is preferably greater than or equal to 0.5 µm and less than or equal to 10 µm, more preferably greater than or equal to 0.5 µm and less than or equal to 5 µm. Accordingly, an output characteristic of the nonaqueous electrolyte rechargeable battery in accordance with the present embodiment can be secured.

(Carbon Film)

The "carbon film 243 provided at least at a part of surface 241A of LiFePO$_4$ particle 241" means that a covering rate of carbon film 243 on surface 241A of LiFePO$_4$ particle 241 is greater than or equal to 50%. When the covering rate of carbon film 243 on surface 241A of LiFePO$_4$ particle 241 is greater than or equal to 50%, a region in which alginic acid salt 245 is provided can be secured, so that an adhesion of second positive electrode active material 240 with respect to other second positive electrode active material 240, conducting agent 340, and positive electrode collector 30 can be secured. The "carbon film 243 provided at least at a part of surface 241A of LiFePO$_4$ particle 241" includes not only the case where at least a part of a surface of a secondary particle constituted of LiFePO$_4$ is covered with carbon film 243 but also the case where at least a part of a surface of a primary particle constituted of LiFePO$_4$ is covered with carbon film 243, and a plurality of primary particles are aggregated to constitute a secondary particle.

The "carbon film 243" includes not only the case where carbon film 243 is constituted only of a carbon material but also the case where an adhesive agent (for example, PVdF) for adhering a carbon material to surface 241A of LiFePO$_4$ particle 241 is included in carbon film 243. It is preferable to adjust a mass of carbon film 243 so as to satisfy (a mass of a LiFePO$_4$ particle):(a mass of a carbon material included in a carbon film)=98:2 to 99:1. Accordingly, since a conductivity is provided to LiFePO$_4$ particle 241, an output characteristic of the nonaqueous electrolyte rechargeable battery can be enhanced. The carbon material included in carbon film 243 is more preferably a carbon material which has been conventionally known as a conducting agent of positive electrode mixture layer 40, and yet more preferably at least one of acetylene black, Ketchen Black (registered trademark), flaky graphite, massive black lead, earthy graphite, and vapor-grown carbon fiber.

The form of carbon film 243 is not limited to the form shown in FIG. 4. For example, the thickness of carbon film 243 (the size of carbon film 243 in a vertical direction with respect to surface 241A of LiFePO$_4$ particle 241) is not always necessary to be even. The form of carbon film 243 may be in common in a plurality of LiFePO$_4$ particles 241 or may be different for each LiFePO$_4$ particle 241.

(Alginic Acid Salt)

The "alginic acid salt 245" includes not only alginic acid metal salt such as sodium alginate, potassium alginate, calcium alginate, or aluminum alginate, but also an ingredient derived from alginic acid metal salt. The "ingredient derived from alginic acid metal salt" means alginic acid metal salt having metal ion ($Na^+$, $K^+$, $Ca^{2+}$, $Al^{3+}$, and the like) detached therefrom, and is for example negative ion constituting alginic acid metal salt. This similarly applies to "alginic acid salt 345." Although the "alginic acid" is a kind of polysaccharide, its molecular weight (in other words, its multiplicity) is not particularly limited.

Preferably, second positive electrode active material 240 includes alginic acid salt 245 of greater than or equal to 1 mass % and less than or equal to 5 mass % with respect to $LiFePO_4$ particle 241. When second positive electrode active material 240 includes alginic acid salt 245 of greater than or equal to 1 mass % with respect to $LiFePO_4$ particle 241, an adhesion of second positive electrode active material 240 with respect to other second positive electrode active material 240, conducting agent 340, and positive electrode collector 30 can be further enhanced. Therefore, a deterioration in the high-rate characteristic can be further prevented. Moreover, lowering of a performance of the nonaqueous electrolyte rechargeable battery during production or use can be further prevented. Further, even when the nonaqueous electrolyte rechargeable battery in accordance with the present embodiment is overdischarged, its performance can be further maintained high.

When second positive electrode active material 240 includes alginic acid salt 245 of less than or equal to 5 mass % with respect to $LiFePO_4$ particle 241, insertion and desorption of lithium ion with respect to $LiFePO_4$ particle 241 can be performed smoothly, so that a reaction resistance can be suppressed to be low.

The form of alginic acid salt 245 is not limited to the form shown in FIG. 4. For example, the shape of alginic acid salt 245 is not limited to the shape shown in FIG. 4, and the number of alginic acid salt 245 provided on one $LiFePO_4$ particle 241 is not limited to the number shown in FIG. 4. The number of alginic acid salt 245 provided on one $LiFePO_4$ particle 241 may be the same for a plurality of $LiFePO_4$ particles 241, or may be different for each $LiFePO_4$ particle 241.

<Conducting Agent>

The content of conducting agent 340 in positive electrode mixture layer 40 is preferably a content which has been conventionally known as a content of a conducting agent in an electrode mixture layer of a nonaqueous electrolyte rechargeable battery. For example, positive electrode mixture layer 40 includes conducting agent 340 of preferably greater than or equal to 5 mass % and less than or equal to 20 mass %, and more preferably greater than or equal to 10 mass % and less than or equal to 15 mass %.

By confirming a cross sectional SEM image of positive electrode mixture layer 40, a configuration of conducting agent 340 (for example, whether or not alginic acid salt 345 is provided at least at a part of surface 341A of carbon particle 341) can be confirmed. Compositions of carbon particle 341 and alginic acid salt 345 can be inspected by means of the EDX. The median diameter (d50) of carbon particle 341 can be measured by a laser diffraction scattering method.

(Carbon Particle)

The carbon material included in carbon particle 341 is preferably a carbon material which has been conventionally known as a conducting agent of positive electrode mixture layer, and more preferably at least one of acetylene black, Ketchen Black (registered trademark), flaky graphite, massive black lead, earthy graphite, and vapor-grown carbon fiber.

The form of carbon particle 341 is not limited to the form shown in FIG. 5. For example, "carbon particle 341" includes not only the case where carbon particle 341 is a sphere but also the case where carbon particle 341 has a distorted spherical shape. When an acetylene black particle is used as carbon particle 341, it is preferable to use an acetylene black particle having a median diameter (d50) of greater than or equal to 30 nm and less than or equal to 40 nm. When a particle made of black lead is used as carbon particle 341, it is preferable to use a particle made of black lead having a median diameter (d50) of greater than or equal to 1 μm and less than or equal to 5 μm.

(Alginic Acid Salt)

Preferably, conducting agent 340 includes alginic acid salt 345 of greater than or equal to 1 mass % and less than or equal to 5 mass % with respect to carbon particle 341. When conducting agent 340 includes alginic acid salt 345 of greater than or equal to 1 mass % with respect to carbon particle 341, an adhesion of conducting agent 340 with respect to second positive electrode active material 240 and positive electrode collector 30 can be further enhanced. Therefore, a deterioration in the high-rate characteristic can be further prevented. Moreover, even when the nonaqueous electrolyte rechargeable battery in accordance with the present embodiment is overdischarged, its performance can be further maintained high. When conducting agent 340 includes alginic acid salt 345 of less than or equal to 5 mass % with respect to carbon particle 341, a conductivity of positive electrode mixture layer 40 can be maintained high.

The form of alginic acid salt 345 is not limited to the form shown in FIG. 5. For example, the shape of alginic acid salt 345 is not limited to the shape shown in FIG. 5, and the number of alginic acid salt 345 provided on one carbon particle 341 is not limited to the number shown in FIG. 5. The number of alginic acid salt 345 provided on one carbon particle 341 may be the same for a plurality of carbon particles 341 or may be different for each carbon particle 341.

<Content of Alginic Acid Salt>

In positive electrode mixture layer 40, a sum total of the content of alginic acid salt 245 and the content of alginic acid salt 345 (hereinafter, referred to as "sum total of the content of alginic acid salt") is preferably greater than or equal to 0.6 mass % and less than or equal to 1.2 mass % with respect to a sum total of the content of NCM particles and a sum total of the content of $LiFePO_4$ particle 241 (hereinafter, referred to as "sum total of the content of the positive electrode active materials").

When the sum total of the content of the alginic acid salt is greater than or equal to 0.6 mass % with respect to the sum total of the content of the positive electrode active materials, an adhesion of second positive electrode active materials 240, an adhesion between second positive electrode active material 240 and conducting agent 340, an adhesion between second positive electrode active material 240 and positive electrode collector 30, and an adhesion between conducting agent 340 and positive electrode collector 30 can be further enhanced. Therefore, a deterioration in the high-rate characteristic can be further prevented. Moreover, lowering of a performance of the nonaqueous electrolyte rechargeable battery during production or use can be further prevented. Further, even when the nonaqueous electrolyte rechargeable battery in accordance with the present embodiment is overdischarged, its performance can be further maintained high.

Not only that, when an adhesion of second positive electrode active materials 240, an adhesion between second positive electrode active material 240 and conducting agent 340, an adhesion between second positive electrode active material 240 and positive electrode collector 30, and an adhesion between conducting agent 340 and positive electrode collector 30 can be further enhanced, an adhesion between positive electrode collector 30 and positive electrode mixture layer 40 can be secured even if positive electrode mixture layer 40 does not include a binding agent (for example, PVdF) which has been conventionally known as a binding agent included in a positive electrode mixture layer of a nonaqueous electrolyte rechargeable battery. Accordingly, the content ratio of the positive electrode active material in positive electrode mixture layer 40 can be increased, so that the battery capacity of the nonaqueous electrolyte rechargeable battery can be increased.

It should be noted that, since a particle diameter of each of second positive electrode active material 240 and conducting agent 340 is smaller than a particle diameter of first positive electrode active material 140, second positive electrode active material 240 and conducting agent 340 are present between first positive electrode active materials 140 adjacent to each other (FIG. 7A). Therefore, first positive electrode active material 140 adheres to surface layer 33 or other first positive electrode active material 140 by means of at least one of alginic acid salt 245 and alginic acid salt 345. Accordingly, when the sum total of the content of alginic acid salt is greater than or equal to 0.6 mass % with respect to the sum total of the content of the positive electrode active material, first positive electrode active material 140 can be prevented from dropping out from positive electrode collector 30 even if a binding agent which has been conventionally known as a binding agent included in a positive electrode mixture layer of a nonaqueous electrolyte rechargeable battery is not included in positive electrode mixture layer 40.

In order to achieve these effects, it is preferable that the sum total of the content of alginic acid salt is greater. The sum total of the content of alginic acid salt is more preferably greater than or equal to 0.8 mass %, more preferably greater than or equal to 1.0 mass % with respect to the sum total of the content of the positive electrode active material.

On the other hand, as the sum total of the content of alginic acid salt becomes greater, lowering of an output of the nonaqueous electrolyte rechargeable battery in a low SOC is induced. However, when the sum total of the content of alginic acid salt is less than or equal to 1.2 mass % with respect to the sum total of the content of the positive electrode active material, an output of the nonaqueous electrolyte rechargeable battery in a low SOC can be maintained high.

[Negative Electrode]

Negative electrode collector 70 preferably has a configuration which has been conventionally known as a negative electrode collector of a nonaqueous electrolyte rechargeable battery, and is preferably, for example, a copper foil having a thickness of greater than or equal to 5 μm and less than or equal to 50 μm.

Negative electrode mixture layer 80 preferably includes a negative electrode active material and a binding agent. The negative electrode active material preferably is a material which has been conventionally known as a negative electrode active material of a nonaqueous electrolyte rechargeable battery, and is preferably, for example, a material having natural graphite as a core member. The binding agent preferably is a material which has been conventionally known as a binding agent included in a negative electrode mixture layer of a nonaqueous electrolyte rechargeable battery, and is preferably, for example, SBR (styrene-butadiene rubber).

The content of the negative electrode active material in negative electrode mixture layer 80 preferably is a content which has been conventionally known as a content of a negative electrode active material in a negative electrode mixture layer of a nonaqueous electrolyte rechargeable battery, and is preferable, for example, greater than or equal to 80 mass % and less than or equal to 95 mass %. The content of the binding agent in negative electrode mixture layer 80 preferably is a content which has been conventionally known as a content of a binding agent in a negative electrode mixture layer of a nonaqueous electrolyte rechargeable battery, and is preferably, for example, greater than or equal to 5 mass % and less than or equal to 20 mass %.

[Separator]

Separator 15 preferably has a configuration which has been conventionally known as a separator of a nonaqueous electrolyte rechargeable battery. For example, separator 15 may be a layered body of resin layers made of porous polyolefin-based resin (for example, polypropylene), or may further have a heat-resistant layer.

[Nonaqueous Electrolyte]

Nonaqueous electrolyte preferably has a configuration which has been conventionally known as nonaqueous electrolyte of a nonaqueous electrolyte rechargeable battery. For example, nonaqueous electrolyte preferably includes one or more kind of organic solvent or gel solvent, and a lithium salt (solute).

[Manufacturing Nonaqueous Electrolyte Rechargeable Battery]

The nonaqueous electrolyte rechargeable battery in accordance with the present embodiment can be manufactured by a conventionally known method except for producing a positive electrode by the following method.

<Producing Positive Electrode>

(Preparing Positive Electrode Collector)

For example, carbon paste including an adhesive agent is provided at least at a portion of surface 31A of main body layer 31 where positive electrode mixture layer 40 is provided, and then the adhesive agent is dried. Accordingly, positive electrode collector 30 can be obtained.

(Producing Positive Electrode Mixture Slurry)

In a solvent (for example, water), first positive electrode active materials 140, $LiFePO_4$/C particles 249, carbon particles 341, and alginic acid salt (powder) are kneaded. The alginic acid salt selectively adheres to a surface of a carbon material. Therefore, a part of the alginic acid salt selectively adheres to surface 243A of carbon film 243, so that second positive electrode active material 240 can be obtained. Moreover, a remaining part of alginic acid salt selectively adheres to surface 341A of carbon particle 341, so that conducting agent 340 can be obtained. Accordingly, second positive electrode active materials 240 adhere to each other by means of alginic acid salt 245. Moreover, second positive electrode active material 240 and conducting agent 340 adhere to each other by means of at least one of alginic acid salt 245 and alginic acid salt 345. Since the positive electrode mixture slurry can be obtained in such a manner, formation of an aggregate of $LiFePO_4$/C particles 249 can be prevented.

It should be noted that the positive electrode mixture slurry may be obtained by kneading first positive electrode active materials 140, LiFePO$_4$/C particles 249, carbon particles 341, and a solution including alginic acid salt. Even in this case, formation of an aggregate of LiFePO$_4$/C particles 249 can be prevented.

(Applying, Drying, Rolling)

The positive electrode mixture slurry is applied to surface 30A of positive electrode collector 30 so that one end of positive electrode collector 30 in the width direction is exposed. When surface layer 33 is provided only at a part of surface 31A of main body layer 31, the positive electrode mixture slurry is applied on surface layer 33. Herein, the alginic acid salt selectively adheres to a surface of a carbon material. Therefore, second positive electrode active material 240 adheres to surface layer 33 by means of alginic acid salt 245, and conducting agent 340 adheres to surface layer 33 by means of alginic acid salt 345. The film formed in such a manner is dried and then rolled. In such a manner, positive electrode 13 can be obtained. It should be noted that the width direction of positive electrode collector 30 is parallel to the width direction of positive electrode 13.

EXAMPLES

Hereinafter, examples are given to describe the present invention more in detail. However, the present invention is not limited to the following examples.

Example 1

Manufacturing Lithium-Ion Rechargeable Battery

<Producing Positive Electrode>
(Producing Positive Electrode Collector)

Carbon paste including acetylene black and PVdF was prepared, and the carbon paste was applied to both entire surfaces of an Al foil. The amount of carbon paste applied to one side of the Al foil (main body layer) was 1 g/m$^2$. After that, the carbon paste applied to both entire surfaces of the Al foil was dried. In such a manner, a positive electrode collector was obtained which was configured to have a surface layer (having a thickness of 1.5 µm) made of carbon on both entire surfaces of the Al foil (having a thickness of 15 µm).

(Preparing Positive Electrode Mixture Slurry)

NCM particles (each having a median diameter (d50) of 6.0 µm), LiFePO$_4$/C particles (each having a median diameter (d50) of 1.5 µm), acetylene black, and sodium alginate were kneaded with the blending amounts shown in Table 1. Water was added to the obtained kneaded object, and the kneaded object was further kneaded. Kneading was performed with use of a planetary mixer. In such a manner, the positive electrode mixture slurry was obtained.

(Applying, Drying, Rolling)

The positive electrode mixture slurry was applied to both faces of the positive electrode collector so that one end of the positive electrode collector in the width direction was exposed. The amount of the positive electrode mixture slurry applied to one face of the positive electrode collector was 30 mg/cm$^2$. After the positive electrode mixture slurry was dried, rolling was performed. In such a manner, the positive electrode was obtained.

<Producing Negative Electrode>

As a negative electrode active material, flaky graphite (having a median diameter (d50) of 10 µm) was prepared. The negative electrode active material, sodium salt (thickening agent) of CMC (carboxymethylcellulose), and SBR (binding agent) were kneaded so as to have a mass ratio of 98:1:1, and diluted with water. In such a manner, the negative electrode mixture slurry was obtained.

The negative electrode mixture slurry was applied to both faces of a Cu foil (a negative electrode collector having a thickness of 10 µm) so that one end of the Cu foil in the width direction was exposed. The amount of the negative electrode mixture slurry applied to one face of the Cu foil was 18 mg/cm$^2$. After the negative electrode mixture slurry was dried, rolling was performed. In such a manner, the negative electrode was obtained.

<Producing and Inserting Electrode Body>

A separator (having a thickness of 25 µm) made of PE (polyethylene) was prepared. The positive electrode, the negative electrode, and the separator were arranged so that a portion where the positive electrode collector is exposed from the positive electrode mixture layer (positive electrode exposed portion) and a portion where the Cu foil is exposed from the negative electrode mixture layer (negative electrode exposed portion) protrude from the separator in directions opposite to each other in the width direction of the positive electrode collector. After that, a winding axis was arranged so as to be parallel to the width direction of the positive electrode collector, and the positive electrode, the separator, and the negative electrode were wound with use of the winding axis. In such a manner, the electrode body (cylindrical electrode body) was obtained.

Next, a battery case (having a diameter of 18 mm, and a height of 650 mm) having a case main body and a cover body was prepared. After providing the electrode body in a recess of the case main body, a bottom portion of the case main body was connected with the negative electrode exposed portion, and the cover body was connected with the positive electrode exposed portion. After that, the opening of the case body was closed with the cover body.

<Preparing and Injecting Nonaqueous Electrolyte>

EC (ethylene carbonate), EMC (ethyl methyl carbonate), and DMC (dimethyl carbonate) were mixed so as to have a volume ratio of 3:5:2, and LiPF$_6$ was added to the obtained mixture solvent. In the obtained nonaqueous electrolyte, the concentration of LiPF$_6$ was 1.0 mol/L.

The obtained nonaqueous electrolyte was injected from a liquid injection hole formed in the cover body to the recess of the case main body. After reducing the pressure in the case main body, the liquid injection hole was sealed. In such a manner, the lithium-ion rechargeable battery (theoretical capacity: 1.0 Ah) of the present example was obtained.

<<Measuring Output in Low SOC>>

Initial charging and discharging were performed in a thermostatic bath set to be a temperature of 25° C. In the initial charging and discharging, after performing charging with a current (constant current) of 0.2C until the battery voltage reaches 4.1 V, discharging was performed with a current (constant current) of 0.2C until the battery voltage reaches 3.0V. After that, the battery capacity was measured.

Next, in the thermostatic bath set to be a temperature of 25° C., electricity having a quantity corresponding to the SOC of 20% was given to the lithium-ion rechargeable battery. After leaving it in the thermostatic bath set to be a temperature of −6.7° C. for four hours, CP (constant power) discharging was performed for 8 to 12 seconds. After that, an output value (electric power), which was given at the time when the battery voltage has reached 2.5V in 10 seconds, was calculated. The result is shown in Table 1. It can be said that the output of the lithium-ion rechargeable battery in low SOC is greater as this output value is greater.

TABLE 1

| | Positive Electrode Collector | Blending Amount (Mass Parts) in Positive Electrode Mixture Slurry | | | | | Output in Low SOC (W) | Increase Rate of I-V Resistance | Ejection Rate of Nonaqueous Electrolyte |
|---|---|---|---|---|---|---|---|---|---|
| | | NCM Particle | LiFePO$_4$ Particle | Acetylene Black | Sodium Alginate | PVdF | | | |
| Example 1 | Carbon Coat | 90 | 10 | 4 | 1.0 | 0 | 15.3 | 1.3 | 0.25 |
| Example 2 | Carbon Coat | 90 | 10 | 4 | 0.6 | 0 | 15.6 | 1.4 | 0.28 |
| Example 3 | Carbon Coat | 90 | 10 | 4 | 1.2 | 0 | 15.0 | 1.2 | 0.23 |
| Example 4 | Carbon Coat | 85 | 15 | 4 | 1.0 | 0 | 15.8 | 1.2 | 0.26 |
| Example 5 | Carbon Coat | 80 | 20 | 4 | 1.0 | 0 | 18.5 | 1.5 | 0.28 |
| Example 6 | Carbon Coat | 90 | 10 | 4 | 0.5 | 0 | 13.5 | 2.1 | 0.39 |
| Example 7 | Carbon Coat | 90 | 10 | 4 | 1.3 | 0 | 12.8 | 1.3 | 0.21 |
| Comparative Example 1 | Al foil simple substance | 100 | 0 | 4 | 0 | 3 | 12.5 | 1.2 | 0.3 |
| Comparative Example 2 | Carbon Coat | 90 | 10 | 4 | 0 | 3 | 15.2 | 2.3 | 0.375 |
| Comparative Example 3 | Carbon Coat | 85 | 15 | 4 | 0 | 3 | 15.4 | 2.5 | 0.4 |
| Comparative Example 4 | Carbon Coat | 80 | 20 | 4 | 0 | 3 | 18.4 | 2.6 | 0.425 |

In Table 1, "carbon coat" means that a surface layer made of carbon is provided entirely on both surfaces of the Al foil.

<<Measuring Increase Rate of I-V Resistance>>

In the thermostatic bath set to be a temperature of 25° C., electricity having a quantity corresponding to the SOC of 20% was given to the lithium-ion rechargeable battery. After that, discharging at a current of 3C was performed for 10 seconds, and a voltage change (ΔV) before and after the discharging was calculated. The calculated ΔV was divided by the current to calculate the I-V resistance (initial I-V resistance).

Next, a charging and discharging test at a high rate was performed. In this test, pausing for 10 seconds, discharging at a current of 35C (10 seconds, and a lower limit voltage of 2.5V), pausing for 10 seconds, charging at a current of 8.75C (40 seconds, and an upper limit voltage of 4.3V), and pausing for 10 seconds were performed, and thereafter, the SOC of the lithium-ion rechargeable battery was adjusted to 20%. The series of operations was set as one cycle, and 500 cycles were performed.

After that, discharging was performed for 10 seconds at a current of 3C, and the voltage change (ΔV) before and after discharging was calculated. The calculated ΔV was divided by the current to calculate the I-V resistance (I-V resistance after the test). The increase rate of the I-V resistance was calculated with the following expression. The result is shown in Table 1. It can be said that a deterioration in the high-rate characteristic is prevented as the increase rate of the I-V resistance is lower.

(increase rate of I-V resistance)=(I-V resistance after test)/(initial I-V resistance)

<<Measuring Ejection Rate of Nonaqueous Electrolyte>>

The above-described charging and discharging test at a high rate was performed. After that, the lithium-ion rechargeable battery was disassembled, and the electrode body was taken out from the battery case. The quantity (volume) of the nonaqueous electrolyte resided in the battery case was measured, and the ejection rate of the nonaqueous electrolyte was calculated with use of the following expression. The result is shown in Table 1. It can be said that ejection of the nonaqueous electrolyte from the electrode main body is prevented even when the charging and discharging is performed repeatedly at a high rate with respect to the lithium-ion rechargeable battery, as the ejection rate of the nonaqueous electrolyte is lower.

(an ejection rate of nonaqueous electrolyte)=(a quantity (volume) of nonaqueous electrolyte resided in the battery case)/(a total amount (volume) of nonaqueous electrolyte injected to the recess of the case main body)

Examples 2 to 7

The lithium-ion rechargeable battery was manufactured in accordance with the method described in Example 1 except for changing the configuration of the positive electrode mixture slurry as shown in Table 1. In accordance with the method described in Example 1, the output in the low SOC, the increase rate of I-V resistance, and the ejection rate of nonaqueous electrolyte were calculated. The result is shown in Table 1.

Comparative Example 1

The configuration of the positive electrode mixture slurry was changed as shown in Table 1, and an Al foil (having a thickness of 15 μm) simple substance was used as a positive electrode collector. The lithium-ion rechargeable battery was manufactured in accordance with the method described in Example 1 except for those. In accordance with the method described in Example 1, the output in the low SOC, the increase rate of I-V resistance, and the ejection rate of nonaqueous electrolyte were calculated. The result is shown in Table 1.

Comparative Examples 2-4

The lithium-ion rechargeable battery was manufactured in accordance with the method described in Example 1 except for changing the configuration of the positive electrode mixture slurry as shown in Table 1. In accordance with the method described in Example 1, the output in the low SOC, the increase rate of I-V resistance, and the ejection rate of nonaqueous electrolyte were calculated. The result is shown in Table 1.

[Consideration]

The output in the low SOC was higher in Comparative Examples 2 to 4 than Comparative Example 1. In Comparative Example 1, an NCM particle simple substance is used as a positive electrode active material. On the other hand, in Comparative Examples 2 to 4, the NCM particles and LiFePO$_4$ particles are used as a positive electrode active material. It can be considered that the result described above was obtained because of this. Moreover, since the output in the low SOC became higher in the order of Comparative Example 2, Comparative Example 3, and Comparative Example 4, it was found that the output in the low SOC becomes higher as the blending amount of the LiFePO$_4$ particles increases.

However, the increase rate of the I-V resistance and the ejection rate of the nonaqueous electrolyte were higher in Comparative Examples 2 to 4 than Comparative Example 1.

In Comparative Examples 2 to 4, the LiFePO$_4$ particle was used as a positive electrode active material, but the positive electrode mixture layer was formed with use of the positive electrode mixture slurry which does not contain sodium alginate. It is considered that an aggregate of LiFePO$_4$/C particles was formed during preparation of the positive electrode mixture slurry because of this.

Moreover, the increase rate of the I-V resistance and the ejection rate of the nonaqueous electrolyte increased in the order of Comparative Example 2, Comparative Example 3, and Comparative Example 4. It is considered that the aggregate of LiFePO$_4$/C particles became more likely to be formed as the blending amount of the LiFePO$_4$ particles increases because of this.

In Examples 1 to 7, the output in the low SOC was higher than Comparative Example 1, and the increase rate of the I-V resistance was lower than Comparative Examples 2 to 4. In Examples 1 to 7, it is considered that the output in the low SOC was higher than Comparative Example 1 because the NCM particles and LiFePO$_4$ particles were used as the positive electrode active material. Moreover, in Examples 1 to 7, the positive electrode mixture layer was formed with use of the positive electrode mixture slurry including alginate sodium. It is considered that formation of the aggregate of the LiFePO$_4$/C particles during preparation of the positive electrode mixture slurry could be prevented because of this.

The increase rate of the I-V resistance and the ejection rate of the nonaqueous electrolyte were further lower in Examples 1 to 5 than Example 6. It was found that the blending amount of sodium alginate is preferably greater than or equal to 0.6 mass % with respect to the sum total of the blending amount of the NCM particles and the blending amount of the LiFePO$_4$ particles.

The output in the low SOC was further higher in Examples 1 to 5 than Example 7. It was found that the blending amount of sodium alginate is preferably less than or equal to 1.2 mass % with respect to the sum total of the blending amount of the NCM particles and the blending amount of the LiFePO$_4$ particles.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A nonaqueous electrolyte rechargeable battery comprising a positive electrode including a positive electrode collector and a positive electrode mixture layer provided on a surface of said positive electrode collector,
    said positive electrode collector having a main body layer and a surface layer, said surface layer being provided at least at a portion of a surface of said main body layer where said positive electrode mixture layer is provided, and being made of a carbon material,
    said positive electrode mixture layer having a first positive electrode active material, a second positive electrode active material, and a conducting agent,
    said first positive electrode active material being made of first lithium complex oxide having a layered crystal structure,
    said second positive electrode active material including a particle made of second lithium complex oxide having an olivine crystal structure, a carbon film provided at least at a part of a surface of said particle made of second lithium complex oxide, and alginic acid salt provided at least at a part of a surface of said carbon film,
    said conducting agent including a carbon particle and alginic acid salt provided at least at a part of a surface of said carbon particle.

2. The nonaqueous electrolyte rechargeable battery according to claim 1, wherein a thickness of said surface layer is greater than or equal to 0.06 times and less than or equal to 0.2 times with respect to a thickness of said main body layer.

3. The nonaqueous electrolyte rechargeable battery according to claim 1, wherein in said positive electrode mixture layer, a sum total of a mass of said alginic acid salt included in said second positive electrode active material and a mass of said alginic acid salt included in said conducting agent is greater than or equal to 0.6 mass % and less than or equal to 1.2 mass % with respect to a sum total of a mass of said first lithium complex oxide and a mass of said second lithium complex oxide.

4. The nonaqueous electrolyte rechargeable battery according to claim 3, wherein a thickness of said surface layer is greater than or equal to 0.06 times and less than or equal to 0.2 times with respect to a thickness of said main body layer.

* * * * *